T. HILLMER.
DEVICE FOR WEIGHING LIQUIDS CONTAINED IN STORAGE RESERVOIRS.
APPLICATION FILED JUNE 1, 1910.
988,342.
Patented Apr. 4, 1911.
2 SHEETS—SHEET 2.
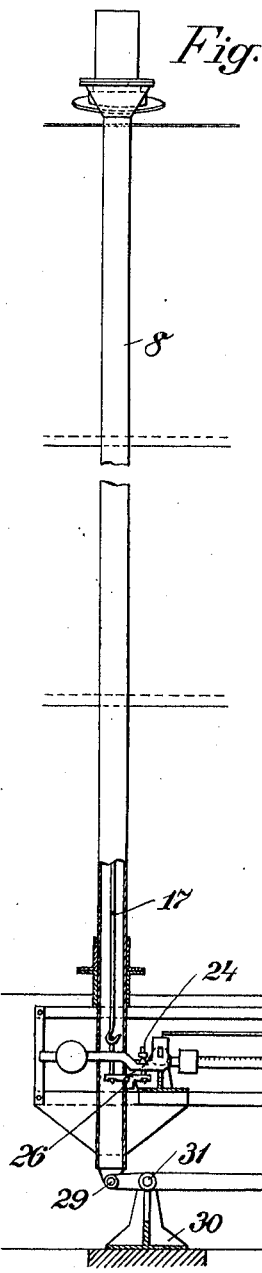
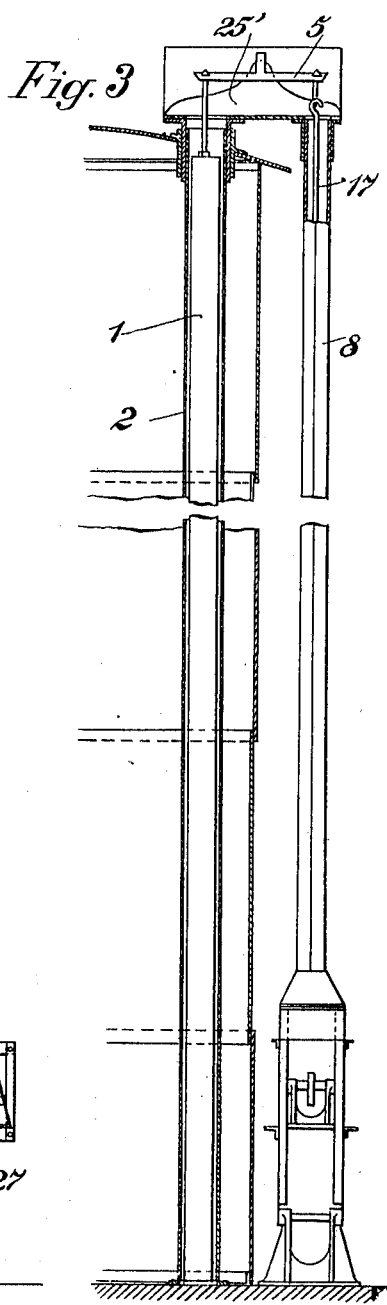

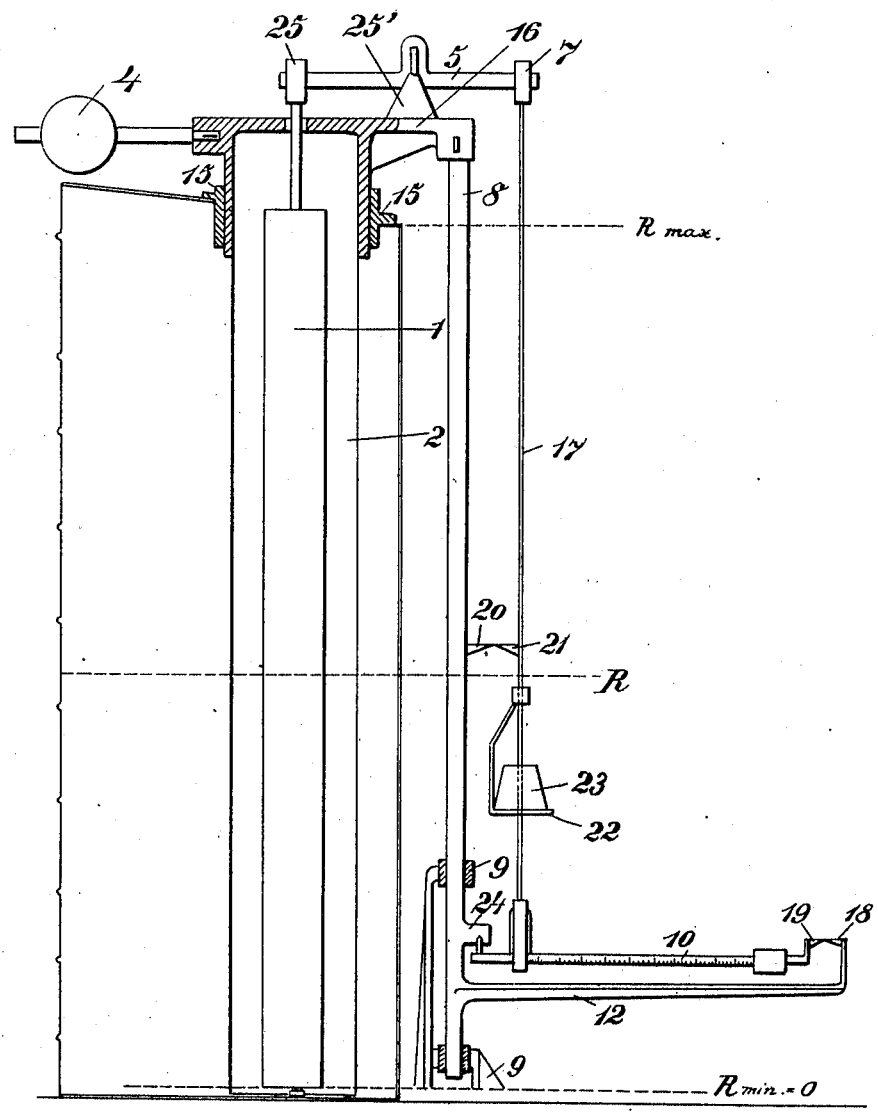

UNITED STATES PATENT OFFICE.

THEODOR HILLMER, OF BUCHAREST, ROUMANIA.

DEVICE FOR WEIGHING LIQUIDS CONTAINED IN STORAGE-RESERVOIRS.

988,342.  Specification of Letters Patent.  Patented Apr. 4, 1911.

Application filed June 1, 1910. Serial No. 564,423.

*To all whom it may concern:*

Be it known that I, THEODOR HILLMER, subject of the German Emperor, residing at Bucharest, Roumania, have invented a new and useful Device for Weighing Liquids Contained in Storage-Reservoirs; and I do hereby declare the following to be a full, clear, and exact description of the same.

My invention relates to a device for determining the weight of liquids in storage reservoirs by means of a loaded float dipping into the tank. Such an apparatus has been described in my British Patent No. 2812/09, for the main features of which I have also filed an application for a U. S. Patent, under Serial No. 478950, under date of February 19, 1909. In the last mentioned application the float is so balanced by a counter-weight, that when the liquid is at its lowest position, the lower surface of the float touches the liquid level, that is to say, the zero point of the tank, and every cross-section of the float when dipping into the tank has a constant relation to the cross-section of the tank taken at the same height.

A further essential feature of the invention described in the above-mentioned specification is, that the float which dips into the liquid and the standard carrying it, are constructed of like material, and that their longitudinal expansion is unimpeded, so that, on the expansion or contraction of these bodies the lower base surface of the float retains its position.

Many reservoirs are, however, very high, and difficult to mount by night or in bad weather, and this renders the task of weighing considerably more difficult, as the scales are arranged high up on the reservoir. In the present invention, the subject matter of the above-named application has been further improved, so that the scales may be placed upon the ground, without having a detrimental effect upon its other qualities, but especially without influencing the zero point of the displacing body, through temperature changes.

The drawings illustrate two constructions of the invention, and therein,

Figure 1 shows a construction in longitudinal section, while Figs. 2 and 3 show the second construction, in two sections perpendicular to each other.

In the present invention the displacing body 1, (Fig. 1) is constructed heavier than the liquid to be displaced, so that it always has the tendency to sink to the bottom of the same, even if the reservoir 14 is entirely full. The body 1 hangs freely in a column 2, which can move in a sleeve 15, fastened to the reservoir cover. The beam of the scale 5, on which is suspended by knife bearing 25 the body 1, rests on a base-plate 16, which is rigidly connected with the column 2, and is supported in the knife bearing 25'. On the plate 16 hangs, also in rigid connection, a guide rod 8, which is guided in a guiding standard 9, fixed in the ground. On this rod is arranged the knife bearing 24 of a second scale beam 10, as well as the frame of the scale 12, with the pointer 18. A tension rod 17, which at the top carries a knife bearing 7, hangs on the other end of the upper scale beam 5, and at its lower end is suspended to the scale beam 10, also by a knife bearing 26.

The pair of pointers 18 and 19 indicate, if the sliding weight stands at zero, that the float is also at zero, and when placed at zero, counterbalances when the reservoir is empty, the displacing body, if the same stands at zero. The weight of the liquid is, however, as in application Serial No. 478950, indicated by unloading the scale. In order to attain a quiet position for the scale and avoid a jamming of the column 2 in the guide 15, there can be employed a counter weight 4, for balancing the weights of the plate 16, the lever and the scale beams.

The compensating of the scale for the purpose of maintaining constant the position of the zero point of the float at any temperature, is, as mentioned in application Ser. No. 478950, dependent upon the condition that all parts exposed to temperature variations which might change the position of the zero point, be constructed of like material. Since the displacing body 1 and the column 2, on the one hand, the supporting rod 8 and tension rod 17, on the other hand, which, in pairs, are located in the same medium, and, consequently, under the same heat influence, expand or contract equally, the zero point remains unchanged in its position under temperature variations, since the variations in length produced thereby balance. Instead of providing the scale beam 10 with a sliding weight, there can be attached to the scale arm a pan 22 with changeable weights 23. This pan hangs directly on the tension rod 17: the zero point of the displacing body 1 is made visible by the position of the pointers 20 and 21. In this case also the weight is shown by unloading weight, and it serves at the same time for balancing the displacing body 1, standing at zero when the reservoir is empty, and then the pointers 20, 21 make visible the zero point of the same.

In the construction illustrated in Fig. 1 the rods 17 and 8 are arranged near each other. In order to save space, and to protect the rod 17 from external influences, the rod 17, in accordance with the construction shown in Figs. 2 and 3, is arranged inside the hollow rod 8. In this construction there is interposed, below on the scale, between the rod 17 and the scale beam 10, an equal arm lever 26, in order so to form the principal bearing 24 of the scale beam 10, that its knife edge is directed downward.

In place of the weight 4 (Fig. 1) for balancing the weight of the scale, in this construction there is employed a lever 28 with counter weight 27. Thereby is avoided, as in the construction according to Fig. 1, a possible clogging of the column 2. The lever 28 is rotatable about the point 31 of the bearing 30 fixed to the ground, and it is, at 29 linked with the rod 8, whereby the bearing standard 9 illustrated in Fig. 1 is replaced and the friction reduced. The column 2 is thereby almost entirely freed from load, as it has scarcely more than its own weight to carry, whereby a substantial economy of material can be attained.

Having thus fully described and illustrated my invention, what I claim, is:

1. In a device for determining the weight of liquids contained in storage reservoirs, a float dipping into the liquid; a column inclosing the float and made of the same material; a scale supported by the top of the column; a guide rod also rigidly supported by the top of the column and extending downward outside of the reservoir; bearings for said guide rod; a tension rod transmitting the motion of the scale beam and composed of the same material as the guide rod; rigid tongues attached to the guide rod for observing the balancing; a scale beam, knife-edges on the guide and tension rods supporting said scale beam, all arranged to enable the weighing to be done at the base of the reservoir and to maintain in their position the transmitting members employed, through equal expansion at all temperatures.

2. In a device for determining the weight of liquids in storage reservoirs, a float dipping into the liquid; a column surrounding the float; a scale supported by the top of the column carrying at one end the float; a hollow guide arm rigidly attached to the top of the column and extending downwardly outside the reservoir; a tension rod supported at the outer end of the scale and inclosed within the hollow guide rod, a scale beam at the base of the reservoir, knife edges supporting said scale beam from the guide and tension rods, in combination with pointers to indicate the zero position of the float.

3. In a device for determining the weight of liquid in storage reservoirs, a float dipping into the liquid; column supported by the reservoir and inclosing the float; a scale carried on the top of the column and supporting at one end the float; a guide rod rigidly attached to the top of the column and projecting downwardly outside the reservoir; a scale beam at the base of the reservoir supported by the guide rod; a tension rod carried by the outer arm of the scale located at the top of the column, in combination with an equal arm lever interposed between the tension rod and the scale at the base of the reservoir.

4. In a device for determining the weight of liquids in storage reservoirs, a float dipping into the liquid; a column supported by the reservoir and inclosing the float; a scale carried on the top of the column and supporting at one end the float; a guide rod rigidly attached to the top of the column and extending downward outside the reservoir to the base thereof; a two arm lever fulcrumed in a bearing fixed to the ground and pivoted at one end to the guide rod, in combination with a counter weight adjustable on the lever for balancing the weight of the guide arm.

In testimony whereof, I have signed my name to this specification in the presence of two subscribing witnesses.

THEO. HILLMER.

Witnesses:
 M. LEBEL,
 I. M. SCHEWACH.

---

Copies of this patent may be obtained for five cents each, by addressing the "Commissioner of Patents, Washington, D. C."